United States Patent
Wu et al.

(10) Patent No.: US 9,359,504 B2
(45) Date of Patent: Jun. 7, 2016

(54) SINTERING-ASSISTED DEPOSITION OF UNIFORM TITANIA NANOCRYSTALLINE COATINGS OVER AL FLAKES IN AQUEOUS SOLUTION

(71) Applicants: Toyota Motor Engineering & Manufacturing North America, Inc., Erlanger, KY (US); Toyota Jidosha Kabushiki Kaisha, Toyota-shi Aichi-ken (JP)

(72) Inventors: Songtao Wu, Ann Arbor, MI (US); Khoa Vo, Ypsilanti, MI (US); Debasish Banerjee, Ann Arbor, MI (US); Masahiko Ishii, Okazaki Aichi (JP)

(73) Assignees: Toyota Motor Engineering & Manufacturing North America, Inc., Erlanger, KY (US); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/323,085

(22) Filed: Jul. 3, 2014

(65) Prior Publication Data

US 2016/0002469 A1    Jan. 7, 2016

(51) Int. Cl.
    *B41M 5/52*     (2006.01)
    *C09C 1/00*     (2006.01)
    *B05D 7/00*     (2006.01)

(52) U.S. Cl.
    CPC .............. *C09C 1/0015* (2013.01); *B05D 7/52* (2013.01); *B41M 5/52* (2013.01); *C01P 2004/01* (2013.01); *C01P 2004/03* (2013.01); *C01P 2004/20* (2013.01)

(58) Field of Classification Search
CPC ............ C09B 67/0005; C09B 67/0007; C09B 67/0033; B82Y 20/00; B82Y 30/00; B82Y 40/00; B41M 5/52

See application file for complete search history.

(56) References Cited

U.S. PATENT DOCUMENTS

| | | | |
|---|---|---|---|
| 6,586,098 B1 | 7/2003 | Coulter et al. | |
| 6,776,835 B2 * | 8/2004 | Andes ................... | C09C 1/0015 106/403 |
| 7,060,126 B2 | 6/2006 | Andes et al. | |
| 7,291,216 B2 | 11/2007 | Bujard | |
| 7,419,538 B2 | 9/2008 | Li et al. | |
| 7,943,194 B2 | 5/2011 | Bujard et al. | |

OTHER PUBLICATIONS

Wang et al., "Corrosion resistance of lamellar aluminum pigments coated by SiO2 by sol-gel method", 2011, Corrosion Science, vol. 53, pp. 161-167, Sep. 16, 2010.*
Sacks et al., "Preparation of SiO2 Glass from Model Powder Compact: II, Sintering", 1982, Journal of the American Ceramic Society, vol. 67, No. 8, pp. 53-537, Aug. 1984.*
Heo et al., Deposition of TiO2 thin films using RF magnetron sputtering method and study of their surface characteristics:, 2005, Thin Solid Films, vol. 475, pp. 183-188, Oct. 27, 2004.*
Li Zhou et al, "Characterization of flaky aluminum pigments multicoated by TiO2 and SiO2", Powder Technology, 237 (2013), pp. 514-519, Elsevier B.V.

* cited by examiner

*Primary Examiner* — Nikolay Yushin
(74) *Attorney, Agent, or Firm* — Dinsmore & Shohl LLP

(57) ABSTRACT

A process of forming a multi-layered pigment comprising the steps of: providing a metal core material; treating the metal core material with an acid, depositing a passivation layer onto the metal core material; densifying the metal core material having the passivation layer reducing a pore size of the passivation layer; and depositing a high refractive index material onto the sintered material wherein the high refractive index layer is uniform and crack free.

19 Claims, 6 Drawing Sheets b)

SINTERING-ASSISTED DEPOSITION OF UNIFORM TITANIA NANOCRYSTALLINE COATINGS OVER AL FLAKES IN AQUEOUS SOLUTION

FIELD OF THE INVENTION

The invention relates to processes for forming pigments having metal cores and passivation layers and a uniform smooth layer of a high refractive index material and materials formed by the process.

BACKGROUND OF THE INVENTION

Generally, luster pigments are known in the art for use in various applications such as automotive finishes, coatings and other pigment applications.

Such luster pigments may be formed by deposition of titanium oxide over highly reflective platelet-like aluminum flakes in a water system. The Al flake may include a protection layer of $SiO_2$. $TiO_2$ may be deposited to the Al flake under highly acidic conditions such as at a pH of less than 2.0 such that a hydrolysis reaction for $TiO_2$ may be achieved. However, such a process results in unsatisfactory coatings due to the diffusion of aqueous solution through the $SiO_2$ layer.

Problems associated with the above deposition include both etching of the Al core and a change in pH near the $SiO_2$—Al surface which are undesired for $TiO_2$ deposition. At such low pH, the protons in the aqueous solution can still diffuse through the $SiO_2$ layer and react with the Al core during the typical long deposition period. This side reaction between the proton and Al as well as the resultant pH increase at the core surface renders the deposition of $TiO_2$ difficult. Diffusion of protons through the $SiO_2$ layer may cause a reaction with Al such that hydrogen gas is released causing weak adhesion of the $TiO_2$ particles and the formation of channels or cracks in the $SiO_2$ and $TiO_2$ layers. Additionally, an increase in the pH may cause rapid deposition of the $TiO_2$ layer and formation of large particles of $TiO_2$ which would adversely affect the pigment's properties.

Further increasing the thickness of the protection layer of $SiO_2$ is also undesired as the low refractive index $SiO_2$ would reduce the overall color performance of pigments. There is therefore a need in the art for an improved process and pigment that solves the problems identified above and produces a pigment that has a crack free and uniform $TiO_2$ layer.

SUMMARY OF THE INVENTION

In one aspect, there is disclosed a process of forming a multi-layered pigment comprising the steps of: providing a metal core material; treating the metal core material with an acid, depositing a passivation layer onto the metal core material; densifying the metal core material having the passivation layer reducing a pore size of the passivation layer; and depositing a high refractive index material onto the sintered material wherein the high refractive index layer is uniform and crack free.

In another aspect, there is disclosed a multi-layered pigment that includes a metal core. A passivation layer is applied to and surrounds the metal core. The passivation layer has a thickness less than or equal to 100 nm and a pore size distribution of 2.3 nm for 90 percent of the layer. A high refractive index layer is applied to and surrounds the passivation layer wherein the high refractive index layer is uniform and crack free.

In a further aspect, there is disclosed a multi-layered pigment that includes a metal core. A passivation layer is applied to and surrounds the metal core. The passivation layer has a thickness less than or equal to 100 nm and a pore size distribution of 2.3 nm for 90 percent of the layer. A high refractive index layer is applied to and surrounds the passivation layer wherein the high refractive index layer is uniform and crack free and has a thickness of from 50-200 nm.

DETAILED DESCRIPTION OF THE PREFERRED EMBODIMENTS

Figure 1:
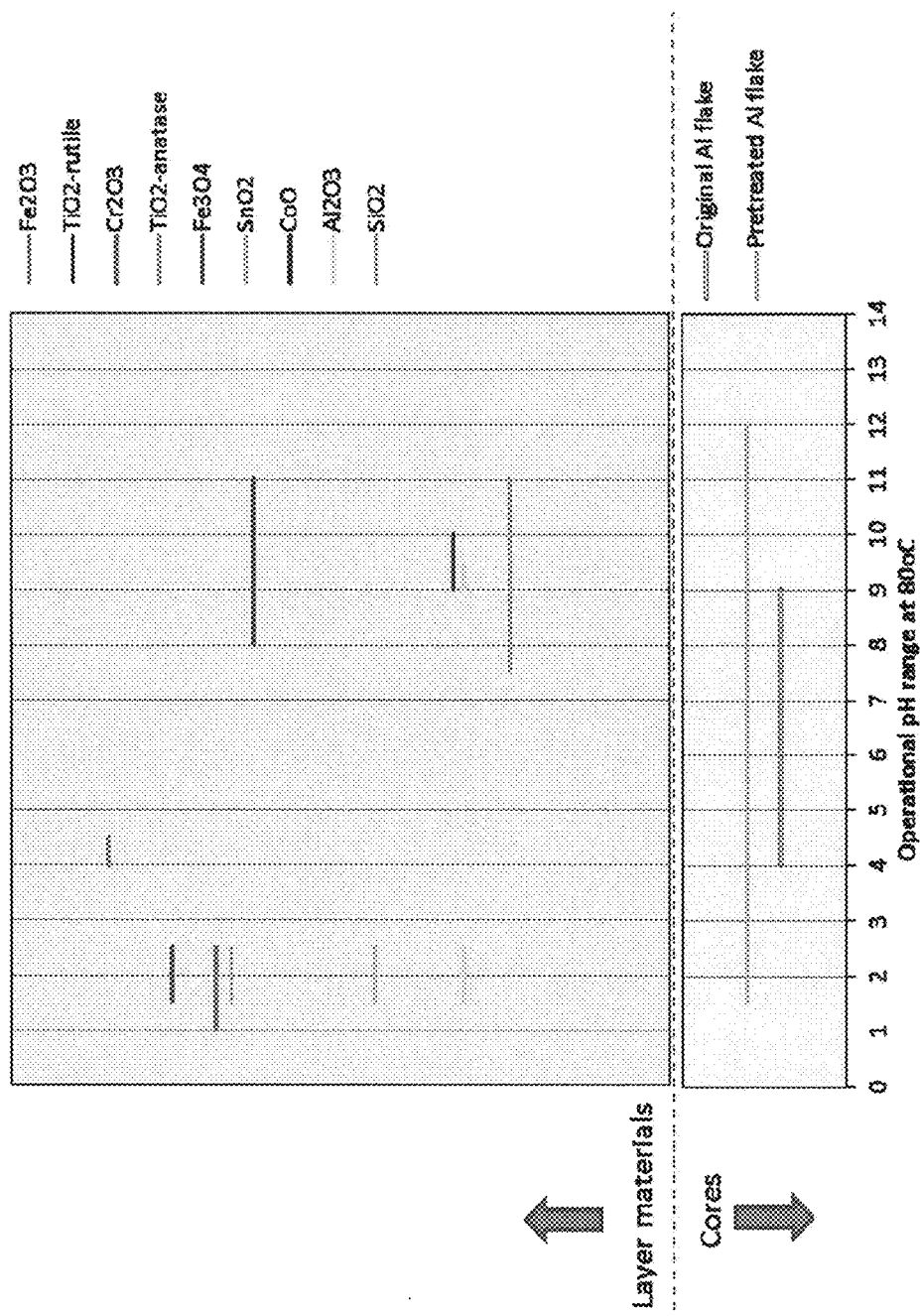
FIG. 1 is a diagram detailing the operation pH range for a process for producing multilayer pigments.

There is disclosed a process of forming a multi-layered pigment and a multi layered pigment that has a uniform surface coating for use in high chroma and other pigment systems. The process provides a low cost sol-gel process using an aqueous system to produce pigments in an economical manner. The multi-layered pigment includes a uniform coating of a high refractive index material that does not include cracks or other imperfections.

The process of the present invention allows for an economical procedure to produce pigments over a broad pH range and eliminates side reactions and processing problems in prior art applications. The process solves the problems of both etching of the Al core and a change in pH near the $SiO_2$—Al surface which are undesired for $TiO_2$ deposition. The process limits diffusion of protons through the $SiO_2$ layer that may cause a reaction with Al such that hydrogen gas is released causing weak adhesion of the $TiO_2$ particles and the formation of channels or cracks in the $SiO_2$ and $TiO_2$ layers.

The process of forming a multi layered pigment includes the steps of: providing a metal core material; treating the metal core material with an acid, depositing a passivation layer onto the metal core material; densifying the metal core material having the passivation layer reducing a pore size of the passivation layer; and depositing a high refractive index material onto the densified material wherein the high refractive index layer is uniform and crack free.

The metal core material may include various metals including Al, Cr and coated Al such as Al coated with a thin layer of $SiO_2$ which requires a further thickness. In one aspect, the passivation layer includes $SiO_2$ and the high refractive index layer includes $TiO_2$. Other passivation layer materials may include $Al_2O_3$. Additional high refractive index materials may include $Fe_2O_3$, $ZrO_2$, $Cr_2O_3$, and $Fe_3O_4$. In one aspect, the passivation layer may have a thickness less than or equal to 100 nm. The high refractive index layer may have a thickness of from 50-200 nm.

The step of treating the metal core material may include suspending the metal core material in a solution of phosphoric acid and acetone and stirring for a specified time. The resulting particles may then be washed and filtered.

The step of depositing a passivation layer onto the metal core material may include suspending the treated metal core particles in ethanol and heating the suspension with the addition of water and ammonia and adding a solution of tetraethoxysilane while stirring. The resulting particles may then be washed and filtered.

After washing and filtering the particles may be densified such that the passivation layer has a pore size distribution of 2.3 nm for 90 percent of the layer. In one aspect, the particles may be densified at a temperature of less than or equal to 400° C. for a specified time.

The step of depositing the high refractive index material onto the densified material may include suspending the densified metal core material having the passivation layer in water and heating the suspension while adding titanium tetrachloride while maintaining the suspension at a pH of 1.8 for a specified time such that $TiO_2$ or another high refractive index material is uniformly deposited on the densified particle without the formation of cracks or other imperfections. The densified particles limit diffusion of protons of the aqueous solution at the very low pH to avoid reaction with the metal core material.

In another aspect, there is disclosed a multi-layered pigment that includes a metal core. A passivation layer is applied to and surrounds the metal core. The passivation layer has a thickness less than or equal to 100 nm and a pore size distribution of 2.3 nm for 90 percent of the layer. A high refractive index layer is applied to and surrounds the passivation layer wherein the high refractive index layer is uniform and crack free.

In a further aspect, there is disclosed a multi-layered pigment that includes a metal core. A passivation layer is applied to and surrounds the metal core. The passivation layer has a thickness less than or equal to 100 nm and a pore size distribution of 2.3 nm for 90 percent of the layer. A high refractive index layer is applied to and surrounds the passivation layer wherein the high refractive index layer is uniform and crack free and has a thickness of from 50-200 nm.

EXAMPLES

Materials $SiO_2$-coated Aluminum flakes were provided by Silberline Manufacturing Co. Tetraethoxysilane (TEOS), Ethanol (99%), acetone, phosphoric acid (85%), aqueous ammonia solution (28%), and titanium (IV) chloride were purchased from Sigma-Aldrich Chemical Co. (St. Louis, Mo.).

Preparation of Anti-Corrosive Aluminum Pigment by Increasing Thickness of $SiO_2$ layer:

The preparation of anti-corrosive aluminum pigment is as follows:

a) Treatment with a phosphoric acid compound:

0.11 g of phosphoric acid (85%) is added to a suspension in which 5 g of $SiO_2$-coated aluminum flakes (thickness of $SiO_2$ is about 15 nm) are dispersed in 55 ml of acetone, and stirred for 30 minutes at room temperature. The suspension is then filtered and washed with acetone two times. The solid parts are filtered and the $SiO_2$-coated aluminum flakes treated with phosphoric acid are obtained.

b) Silica Deposition:

In a round bottom flask equipped with a reflux condenser, the aluminum flakes, treated with phosphoric acid compound, obtained in step a) are suspended in 85 ml of ethanol. The suspension is heated to 65° C. after 22 g of water and 2.2 g of a 28% aqueous ammonia solution had been added. Next, a solution of 6.5 g of tetraethoxysilane diluted with 8 ml of ethanol was added to it in small amounts while stirring. This reaction mixture was stirred for 18 hours at 65° C., and then filtered from the liquid.

Densifying the $SiO_2$-Coated Aluminum Flakes

Anti-corrosive aluminum flakes are washed with water and then dried at room temperature for overnight. Then the flakes are heated in the furnace. The ramp is set as 10° C./min and the temperature is set at 400° C. with dwelling time for 1 hour for further layer deposition.

Depositing $TiO_2$ on Anti-Corrosive Aluminum Flakes by Aqueous System (Water):

5 g of the anti-corrosive aluminum flakes are suspended in 33 ml of water and heated to 75° C. under stirring. 3 ml of titanium tetrachloride solution (40 wt %) is dropped into the suspension at the flow rate of 0.01 ml/min while keeping the pH at 1.8 using sodium hydroxide of 32 wt %. When the reaction is finished, the solid parts are filtered, washed with water, and then dried at 100° C.

The deposition of high refractive index or dielectric materials in the water over platelet or metal cores often requires a very low pH, such as pH 1.8. At such low pH, although passivation layers of $SiO_2$ have been applied at thicknesses of from ~50-100 nm, the protons in the aqueous solution can still diffuse through the $SiO_2$ layer and react with Al core during the long deposition period, such as four hours. This phenomenon is shown by an increase in the pH values of from 1.8 to 3.0 after one hour when $TiO_2$ is deposited onto meal core particles that have $SiO_2$ layers that have not been densified. This side reaction between the proton and Al as well as the resultant pH increase at the core surface renders the deposition of $TiO_2$ using prior art procedures unsatisfactory.

A process for producing multilayer pigment particles should be stable and produce uniform crack free particles over a wide pH range. Referring to FIG. 1, there is shown a diagram depicting the operational pH range for non densified Al core flakes (top), densified Al core flake (bottom), and various high refractive index or dielectric layer materials (above). The overlap in operational pH range for both core and layer materials is needed for successful layer deposition over the selected core.

To decrease diffusion of aqueous solution in the $SiO_2$ layer, a thicker protection $SiO_2$ layer is desired. However, the color strength of pigments would be impaired if the low refractive index $SiO_2$ layer thickness is more than 100 nm.

Figure 2:
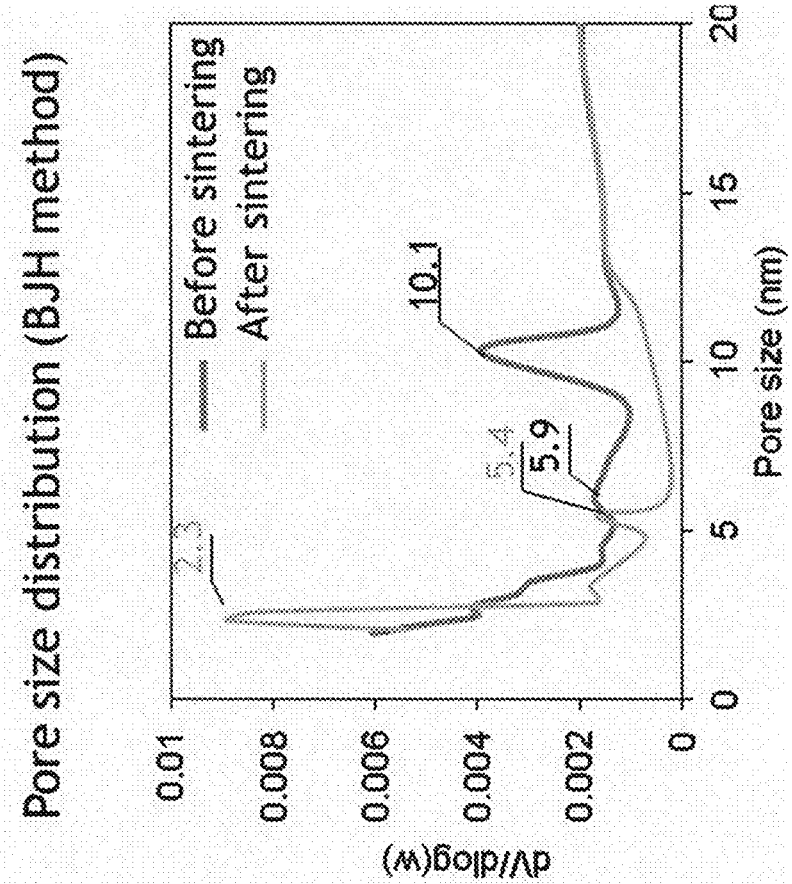
FIG. 2 is graph of the pore size distribution of Al—$SiO_2$ material before and after densifying.
Figure 3:
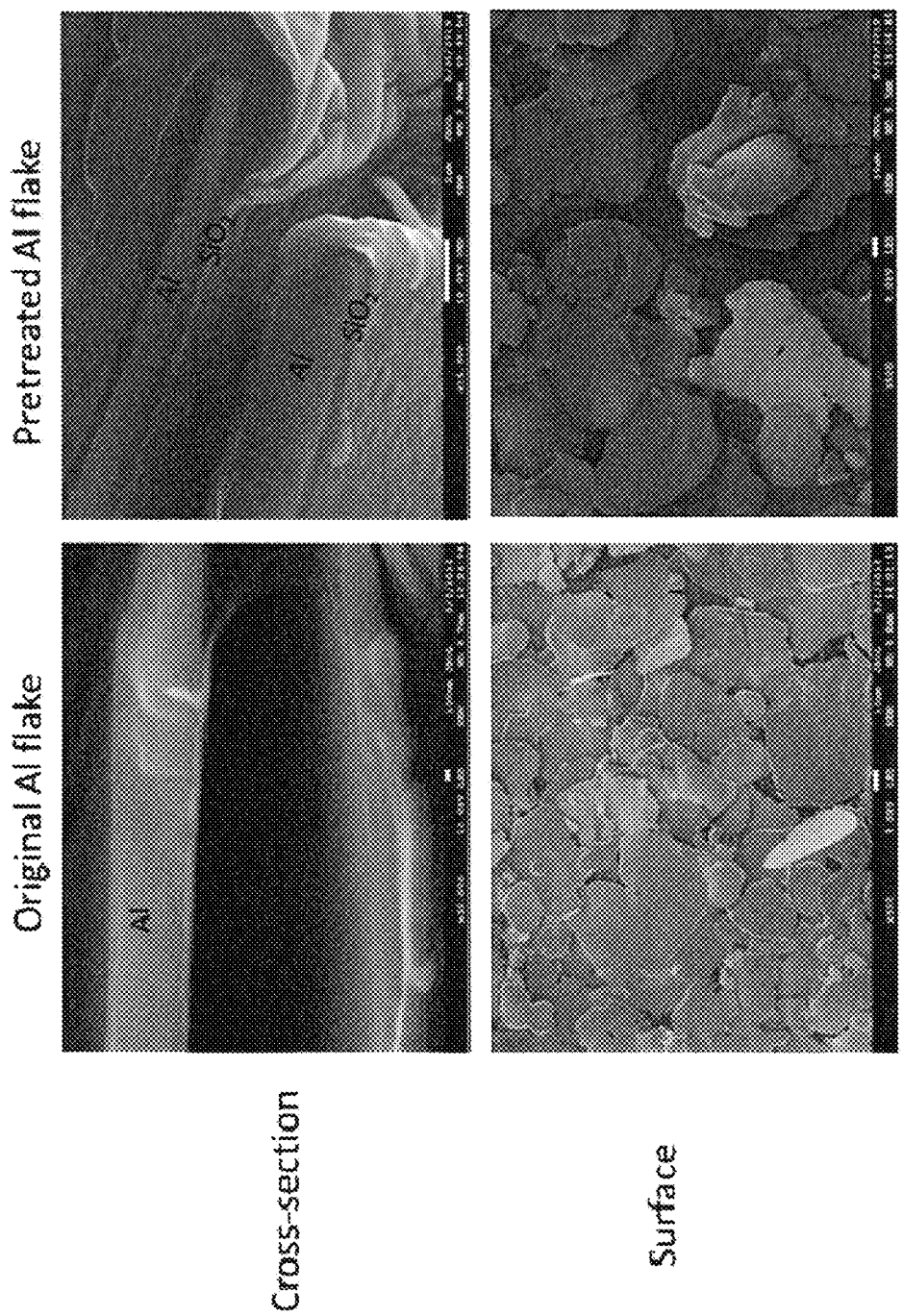
FIG. 3 are SEM images of the metal core and $SiO_2$ layer before and after densifying.

The densification of the core metal particle with the $SiO_2$ layer prior to $TiO_2$ deposition reduces the pore size of the material and provides a narrow pore size distribution that limits the diffusion of protons to the Al core material. Referring to FIG. 2, there is shown a plot of the pore size distribution for both densified and untreated particles. As can be seen in the figure the untreated particles had a pore size of 10.1 for 90% of the particles while the densified particles had a pore size of 2.3 for 90% of the particles. The results in FIG. 2 clearly demonstrated the pore size distribution of $SiO_2$ is reduced as there is a peak shift from large values to smaller ones. The additional $SiO_2$ layer was deposited uniformly over the metal core and has a smooth surface with a thickness of approximately 100 nm. Referring to FIG. 3, there are shown SEM images of the densified and untreated or original flake or particle confirming the uniform deposition of the $SiO_2$ layer.

Figure 4A:
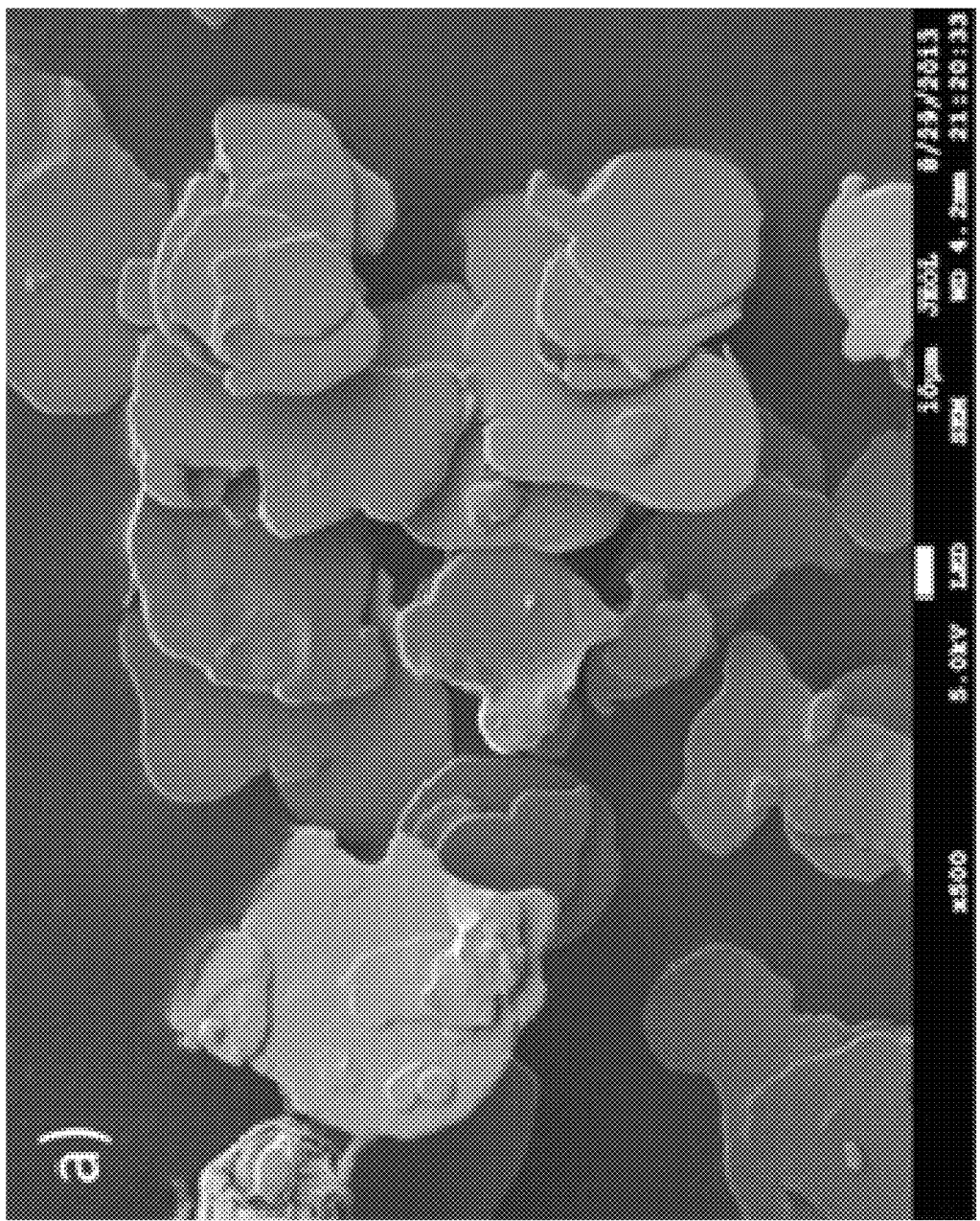
FIG. 4a is an SEM image of a pigment including $TiO_2$ coated over a densifyed $SiO_2$—Al.
Figure 4B:
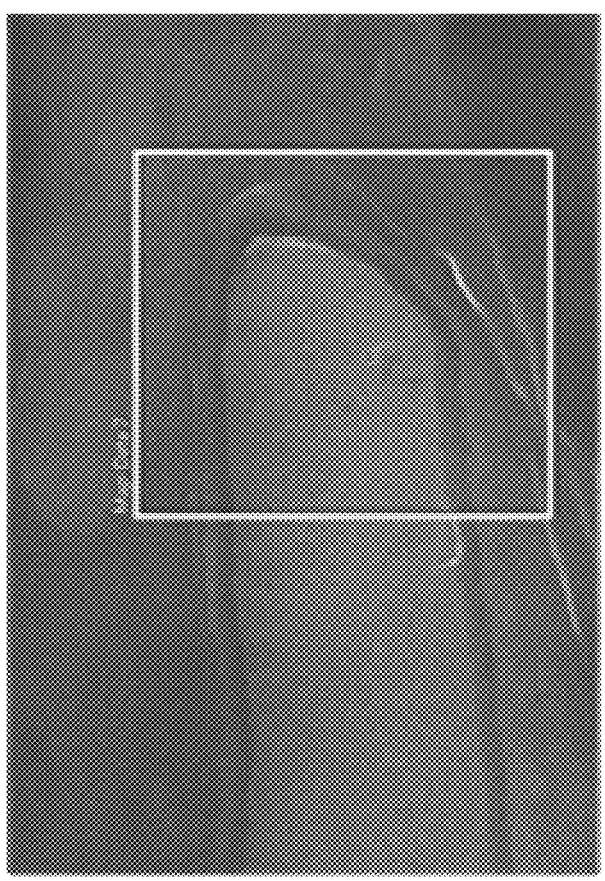
FIG. 4b is an EDX image of the pigment of FIG. 3a detailing the formation of the $TiO_2$ layer over the $SiO_2$—Al particle.
Figure 4B:
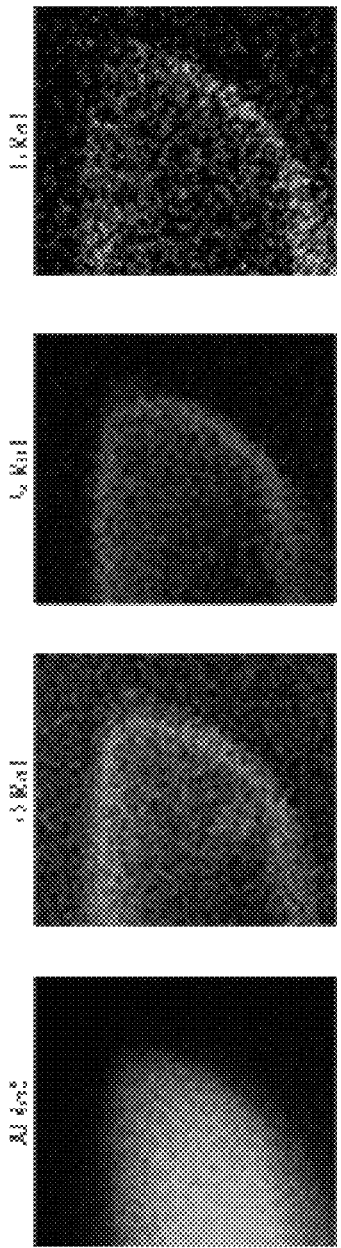
Figure 4C:
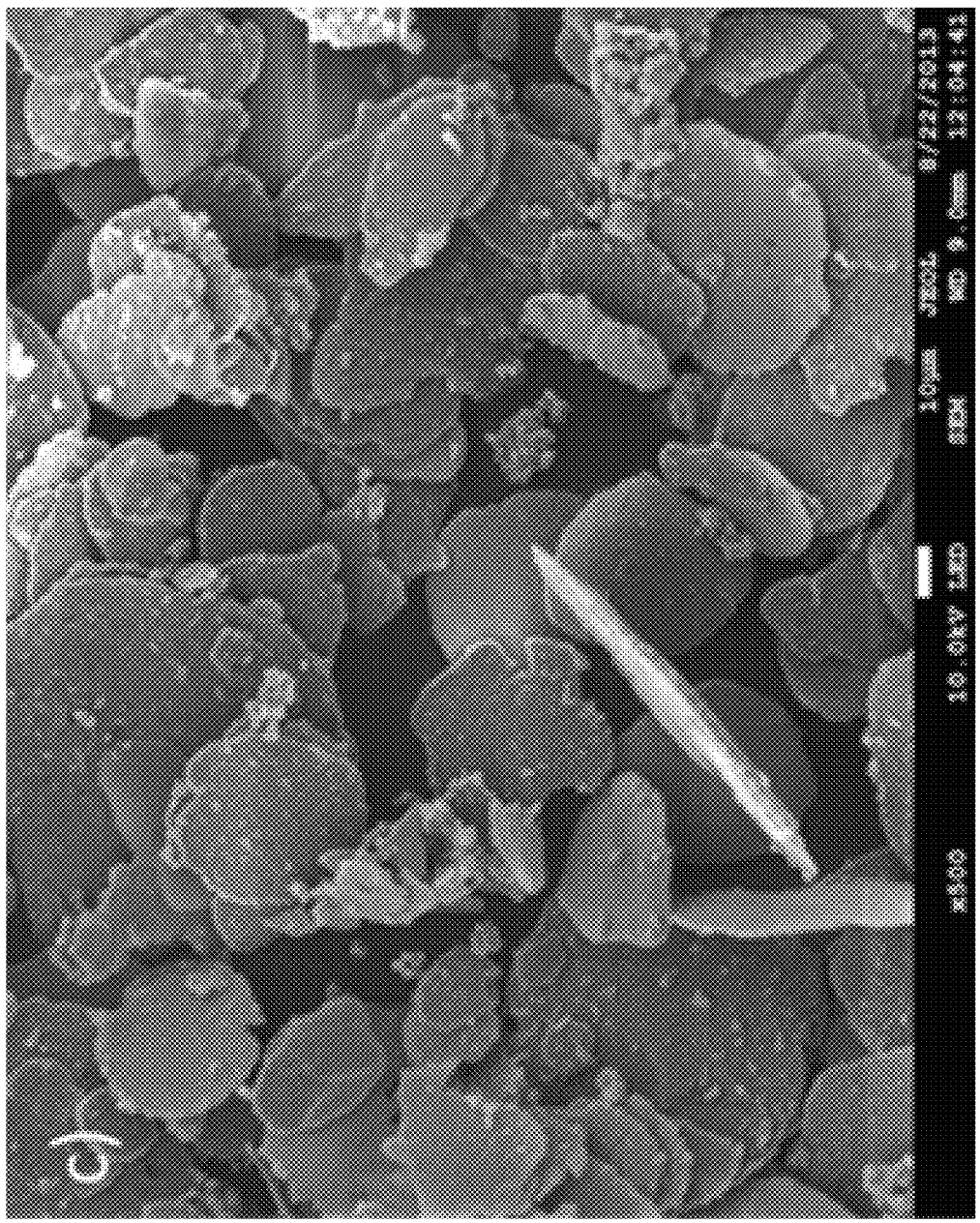
FIG. 4c is an SEM images of a $TiO_2$ coated $SiO_2$—Al particle without densification showing a rough surface.

The narrow pore size distribution in the $SiO_2$ layer results in uniform $TiO_2$ layer deposition over the $SiO_2$—Al surface with no cracks or defects. Referring to FIGS. 4a-c, there are shown SEM images of both the densified particle and an untreated particle. The densified particles as shown in FIGS.

4a and 4b have a smooth uniform surface while the untreated particles of FIG. 4c have a granular rough surface.

The above examples and embodiments are for illustrative purposes only and changes, modifications, and the like will be apparent to those skilled in the art and yet still fall within the scope of the invention. As such, the scope of the invention is defined by the claims.

We claim:

1. A process of forming a multi-layered pigment comprising the steps of:
    providing a metal core material;
    treating the metal core material with an acid,
    depositing a passivation layer onto the metal core material;
    densifying the metal core material having the passivation layer forming a densified material and reducing a pore size of the passivation layer;
    depositing a high refractive index material onto the densified material wherein the high refractive index layer is uniform and crack free wherein the passivation layer has a pore size distribution of 2.3 nm for 90 percent of the layer.

2. The process of forming the multi-layered pigment of claim 1 wherein the passivation layer includes $SiO_2$.

3. The process of forming the multi-layered pigment of claim 1 wherein the high refractive index layer includes $TiO_2$.

4. The process of forming the multi-layered pigment of claim 1 wherein the metal or alloy core is selected from the group consisting of: Al, Cr, coated Al, Ag, Cu, brass, Mn.

5. The process of forming the multi-layered pigment of claim 1 wherein the high refractive index layer has a thickness of from 50-200 nm.

6. The process of forming the multi-layered pigment of claim 1 wherein the passivation layer has a thickness less than or equal to 100 nm.

7. The process of forming the multi-layered pigment of claim 1 wherein the step of treating includes suspending the metal core material in a solution of phosphoric acid and acetone and stirring for a specified time.

8. The process of forming the multi-layered pigment of claim 7 wherein the step of treating further includes the step of washing and filtering the metal core material.

9. The process of forming the multi-layered pigment of claim 1 wherein the step of depositing the passivation layer onto the metal core material includes suspending the treated metal core particles in ethanol and heating the suspension with the addition of water and ammonia and adding a solution of tetraethoxysilane while stirring.

10. The process of forming the multi-layered pigment of claim 9 wherein the step of depositing the passivation layer onto the metal core material further includes the step of washing and filtering.

11. The process of forming the multi-layered pigment of claim 1 wherein the passivation layer is densified at a temperature of less than or equal to 400° C. for a specified time.

12. The process of forming the multi-layered pigment of claim 1 wherein the step of depositing the high refractive index material onto the densified material includes suspending the densified metal core material having the passivation layer in water and heating the suspension while adding titanium tetrachloride while maintaining the suspension at a pH of 1.8.

13. A multi-layered pigment comprising:
    a metal core;
    a passivation layer applied to and surrounding the metal core, the passivation layer having a thickness less than or equal to 100 nm and a pore size distribution of 2.3 nm for 90 percent of the layer;
    a high refractive index layer applied to and surrounding the passivation layer wherein the high refractive index layer is uniform and crack free.

14. The multi-layered pigment of claim 13 wherein the passivation layer includes $SiO_2$.

15. The multi-layered pigment of claim 13 wherein the high refractive index layer includes $TiO_2$.

16. The multi-layered pigment of claim 13 wherein the passivation layer is densified prior to application of the high refractive index layer.

17. The multi-layered pigment of claim 13 wherein the metal core or alloy core is selected from the group consisting of: Al, Cr, coated Al, Ag, Cu, Mn, brass.

18. The multi-layered pigment of claim 13 wherein the high refractive index layer has a thickness of from 50-200 nm.

19. A multi-layered pigment comprising:
    a metal core;
    a passivation layer applied to and surrounding the metal core, the passivation layer having a thickness less than or equal to 100 nm and a pore size distribution of 2.3 nm for 90 percent of the layer;
    a high refractive index layer applied to and surrounding the passivation layer wherein the high refractive index layer is uniform and crack free and has a thickness of from 50-200 nm.

* * * * *